US012626855B2

(12) United States Patent
Otsuka et al.

(10) Patent No.: US 12,626,855 B2
(45) Date of Patent: May 12, 2026

(54) COIL COMPONENT

(71) Applicant: TDK CORPORATION, Tokyo (JP)

(72) Inventors: Shota Otsuka, Tokyo (JP); Takashi Kudo, Tokyo (JP); Kyohei Tonoyama, Tokyo (JP); Taiji Matsui, Tokyo (JP); Ken Satoh, Tokyo (JP); Miyuki Asai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 836 days.

(21) Appl. No.: 17/964,129

(22) Filed: Oct. 12, 2022

(65) Prior Publication Data

US 2023/0119388 A1 Apr. 20, 2023

(30) Foreign Application Priority Data

Oct. 14, 2021 (JP) ................................ 2021-168518

(51) Int. Cl.

| | |
|---|---|
| ***H01F 27/32*** | (2006.01) |
| ***H01F 27/02*** | (2006.01) |
| ***H01F 27/28*** | (2006.01) |
| ***H01F 27/29*** | (2006.01) |
| ***H01F 27/34*** | (2006.01) |

(52) U.S. Cl.

CPC ......... *H01F 27/324* (2013.01); *H01F 27/022* (2013.01); *H01F 27/2847* (2013.01); *H01F 27/29* (2013.01); *H01F 27/34* (2013.01)

(58) Field of Classification Search

CPC ................. H01F 27/324; H01F 27/022; H01F 27/2847; H01F 27/29; H01F 27/34

See application file for complete search history.

(56) References Cited

U.S. PATENT DOCUMENTS

| | | | | |
|---|---|---|---|---|
| 2013/0222101 | A1* | 8/2013 | Ito | H01F 3/08 336/83 |
| 2016/0086714 | A1* | 3/2016 | Moon | H01F 27/292 336/200 |
| 2016/0260535 | A1* | 9/2016 | Kubota | H01F 17/0013 |
| 2018/0137965 | A1* | 5/2018 | Lee | H01F 17/0033 |
| 2020/0051735 | A1* | 2/2020 | Yeo | H01F 27/29 |
| 2020/0135380 | A1* | 4/2020 | Tonoyama | H01F 27/2804 |
| 2021/0183566 | A1 | 6/2021 | Ohkubo et al. | |
| 2022/0013277 | A1* | 1/2022 | Kang | H01F 17/0013 |

FOREIGN PATENT DOCUMENTS

JP 2021-93468 A 6/2021

* cited by examiner

*Primary Examiner* — Malcolm Barnes
(74) *Attorney, Agent, or Firm* — Oliff PLC

(57) ABSTRACT

In the coil component, the external terminal and the metal magnetic powder-containing resin constituting the element body are not in direct contact with each other, and thus high ESD resistance is obtained. That is, even when a high transient voltage is applied between the pair of external terminals, insulation breakdown is less likely to occur, and an improvement in breakdown voltage with respect to the transient voltage can be realized.

4 Claims, 6 Drawing Sheets

COIL COMPONENT

CROSS-REFERENCE TO RELATED APPLICATIONS

This application is based upon and claims the benefit of priority from Japanese Patent Application No. 2021-168518, filed on 14 Oct. 2021, the entire contents of which are incorporated herein by reference.

TECHNICAL FIELD

The present disclosure relates to a coil component.

BACKGROUND

Well known in the art is a coil component in which a coil is provided in an element body made of magnetic material containing metal powder and resin. Patent Document 1 discloses a coil component including a coil having both end portions extracted to end surfaces of the element body, and a pair of external terminals respectively provided on the end surfaces of the element body and electrically connected to the end portions of the coil.

PATENT DOCUMENTS

Patent Document 1: U.S. Patent Application Publication No. 2016/0086714

Patent Document 2: Japanese Patent Application Publication No. 2021-093468

SUMMARY

The above-described coil component is required to have Electro-Static Discharge (ESD) resistance that does not cause insulation breakdown even when large static electricity is instantaneously applied. In particular, the ESD resistance against an extremely high transient voltage (for example, 25 kV) is required for an in-vehicle coil component.

The inventors have repeatedly studied the ESD resistance of the coil component, and have newly found a technique capable of improving the withstand voltage against the transient voltage.

According to the present disclosure, a withstand voltage against a transient voltage of a coil is improved.

According to one aspect of the present disclosure, there is provided A coil component including an element body made of a magnetic material including metal powder and resin, the element body having an upper surface and a lower surface parallel to each other, and a pair of end surfaces orthogonal to the upper surface and the lower surface, an insulating substrate disposed in the element body, the insulating substrate extending parallel to the upper surface and the lower surface, and is exposed at each of the pair of end surfaces, and a first coil body disposed in the element body and formed on the upper surface of the insulating substrate, the first coil body including a first planar coil having a first connection end portion, a first lead-out end portion, and a first turn portion connecting the first connection end portion and the first lead-out end portion, and a first insulator covering the first planar coil in the same layer as a layer in which the first planar coil is formed, a second coil body disposed in the element body and formed on the lower surface of the insulating substrate, the second coil body including a second planar coil having a second connection end portion connected to the first connection end portion of the first planar coil via the insulating substrate, a second lead-out end portion, and a second turn portion connecting the second connection end portion and the second lead-out end portion, and a second insulator that covering the second planar coil in the same layer as the layer in which the second planar coil is formed, and a pair of external terminals respectively provided on the end surfaces of the element body and respectively connected to the first lead-out end portion of the first planar coil and the second lead-out end portion of the second planar coil, wherein at least one of the first insulator and the second insulator is formed over the entire width of the end surface on the insulating substrate and is exposed, and an insulating layer interposed between the external terminal and the element body is formed in a remaining region of an exposed region in the end surface.

In the coil component, since the end surface of the element body is divided into the region where the insulating layer is formed or the region where the first insulator or the second insulator is exposed and the element body is not exposed, the external terminal provided on the end surface and the element body are not in direct contact with each other. Therefore, even when a high transient voltage is applied between the pair of external terminals, insulation breakdown is unlikely to occur, and the withstand voltage of the coil component against the transient voltage is improved. In the first insulator and the second insulator, voids are less likely to occur than in the insulating layer, and insulation breakdown is less likely to occur than in the insulating layer. In the above-described coil component, by exposing the entire width of the end surface of the element body, the reliability of the withstand voltage with respect to the transient voltage is improved compared to a case where the insulating layer is formed on the entire area of the end surface.

In a coil component according to another aspect, both the first insulator and the second insulator are formed over the entire width of the end surface on the insulating substrate and are exposed, and the insulating layer is formed in the remaining region of the pair of end surfaces.

In a coil component according to another aspect, wherein the insulating layer covers at least a portion of the first insulator or the second insulator exposed at the end surface.

In a coil component according to another aspect, the first coil body includes a first insulating layer covering the first planar coil from the upper surface side and is exposed at the end surface, and the second coil body includes a second insulating layer covering the second planar coil from the lower surface side and is exposed at the end surface.

DETAILED DESCRIPTION

Figure 1:
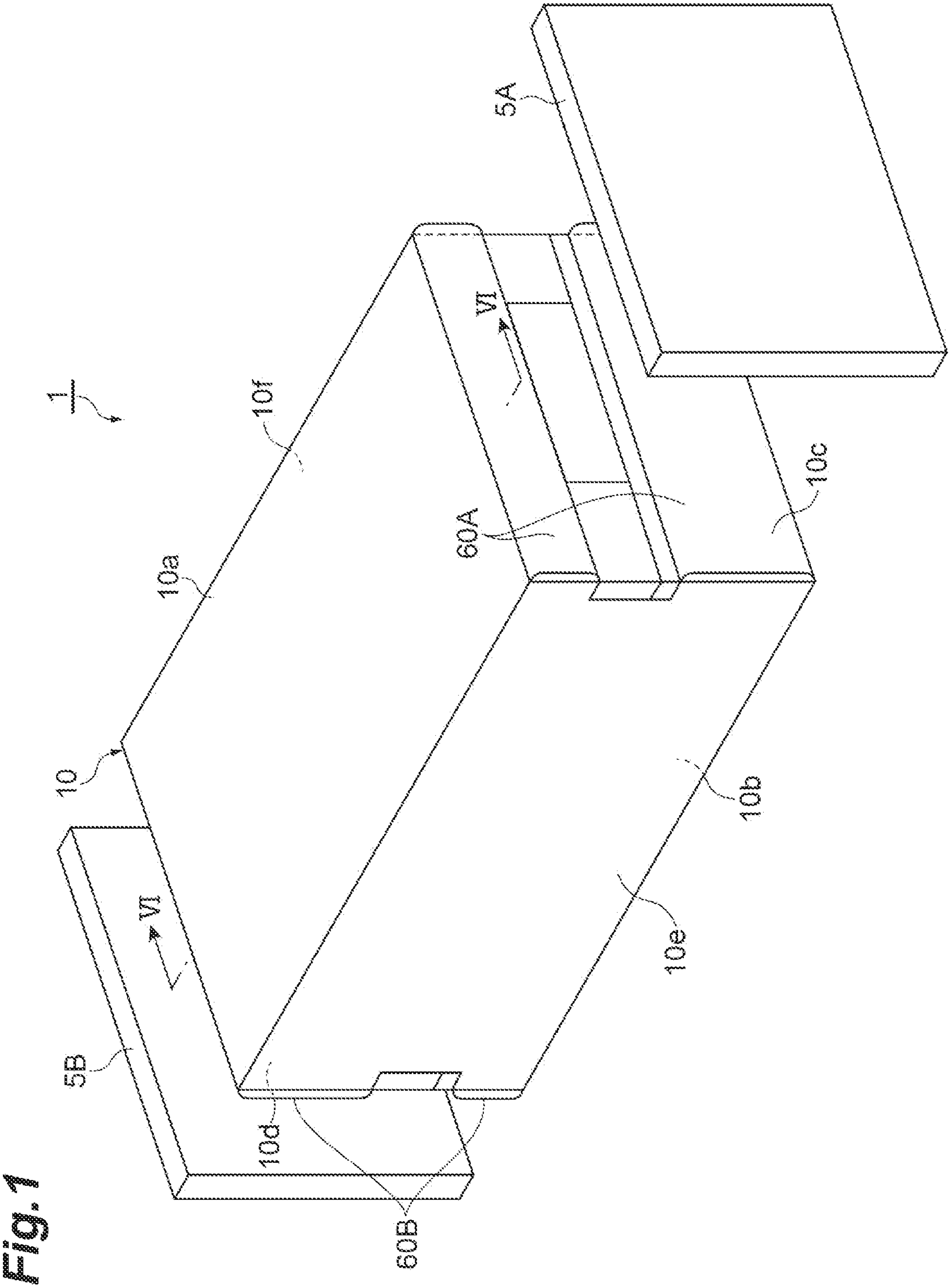
FIG. 1 is a schematic perspective view illustrating a coil component according to an embodiment.

Hereinafter, various embodiments and examples will be described with reference to the drawings. In the drawings, the same or corresponding portions are denoted by the same reference numerals, and redundant description is omitted.

As shown in FIG. 1, the coil component 1 according to the embodiment has a rectangular parallelepiped outer shape. For example, the coil component 1 may be designed to have dimensions of long side 1.2 mm, short side 1.0 mm, and height 0.5 mm. Alternatively, as another example, the coil component 1 may be designed to have dimensions of long side 2.0 mm, short side 1.2 mm, and height 0.6 mm. As still another example, it may be designed with dimensions of long side 2.5 mm, short side 2.0 mm, and height 1.2 mm.

The coil component 1 includes a pair of external terminals 5A and 5B, an element body 10, and a coil portion 20 embedded in the element body 10.

The element body 10 has a rectangular parallelepiped outer shape and has six surfaces 10*a* to 10*f*. Among the surfaces 10*a* to 10*f* of the element body 10, the upper surface 10*a* and the lower surface 10*b* are parallel to each other, the end surface 10*c* and the end surface 10*d* are parallel to each other, and the side surface 10*e* and the side surface 10*f* are parallel to each other.

The element body 10 is made of a magnetic material containing metal magnetic powder and resin (metal magnetic powder-containing resin). The magnetic metal powder-containing resin is a binder powder in which magnetic metal powder is bound by a binder resin. The metal magnetic powder contains, for example, iron example, permalloy, sendust, FeSiCr, FeSi, carbonyl iron, amorphous alloy, nanocrystal, or the like, which contains iron and is an alloy system. The binder resin is, for example, a thermosetting epoxy resin. In the present embodiment, the content of the metallic magnetic powder in the binder powder is 75 to 92 vol % in terms of volume percent, and 95 to 99 wt % in terms of weight percent. From the viewpoint of magnetic properties, the content of the metallic magnetic powder in the binder powder may be 80 to 92 vol % in terms of volume percent and 97 to 99 wt % in terms of weight percent.

The coil portion 20 includes a first coil body 30, an insulating substrate 40, and a second coil body 50. To be specific, the first coil body 30 is provided on the upper surface 40*a* of the insulating substrate 40 located on the upper surface side of the element body 10, and the second coil body 50 is provided on the lower surface 40*b* of the insulating substrate 40 located on the lower surface side of the element body 10. In the present embodiment, the pattern shape of the first coil body 30 viewed from the upper surface 40*a* side of the insulating substrate 40 is the same as the pattern shape of the second coil body 50 viewed from the lower surface 40*b* side of the insulating substrate 40.

Figure 3:
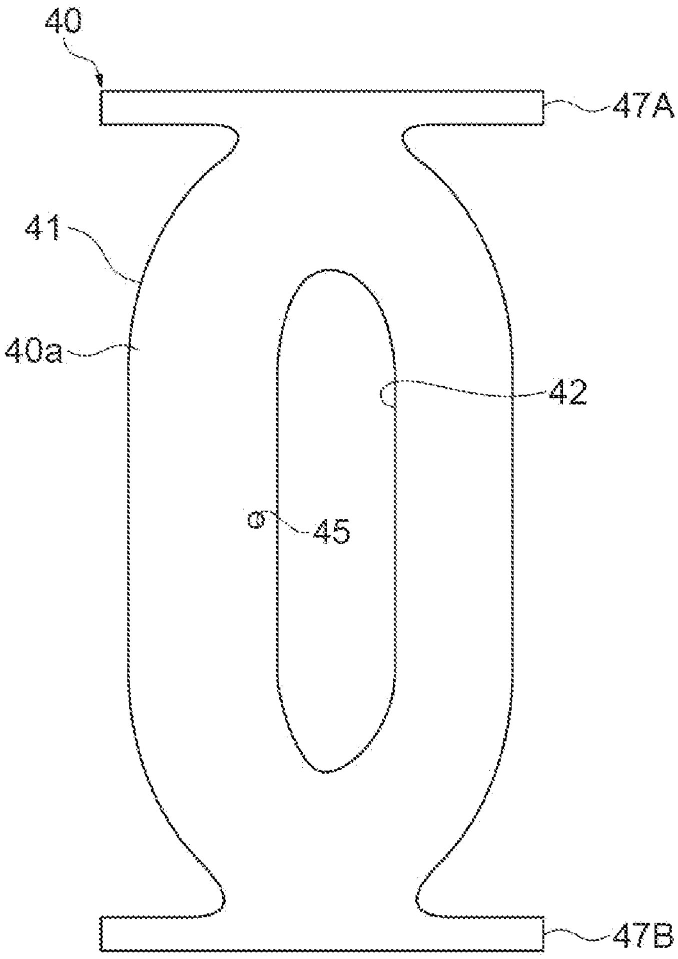
FIG. 3 is a plan view showing a substrate of the coil component shown in FIG. 1.

The insulating substrate 40 is a plate-shaped member extending in parallel to the upper surface 10*a* and the lower surface 10*b* of the element body 10. As shown in FIG. 3, the insulating substrate 40 includes an elliptical ring-shaped coil forming portion 41 extending along the long-side direction of the element body 10, and a pair of frame portions 47A and 47B extending along the short-side direction of the element body 10 and sandwiching the coil forming portion 41 from both sides. Further, the coil forming portion 41 is provided with a circular through hole 45 at an edge portion of the oval opening 42. The through hole 45 is filled with a via conductor to electrically connect an inner end 32*b* of the first planar coil 32 and an inner end 52*b* of the second planar coil 52, which will be described later.

As the insulating substrate 40, a substrate obtained by impregnating a glass cloth with a cyanate resin (BT (bismaleimide triazine) resin: registered trademark) and having a thickness of 60 μm can be used. In addition to the BT resin, polyimide, aramid, or the like can be used. Ceramic or glass can also be used as the material of the insulating substrate 40. The insulating substrate 40 may be a mass-produced printed circuit board material, or may be a plastic material used for a BT printed circuit board, a FR4 printed circuit board, or a FR5 printed circuit board.

Figure 4:
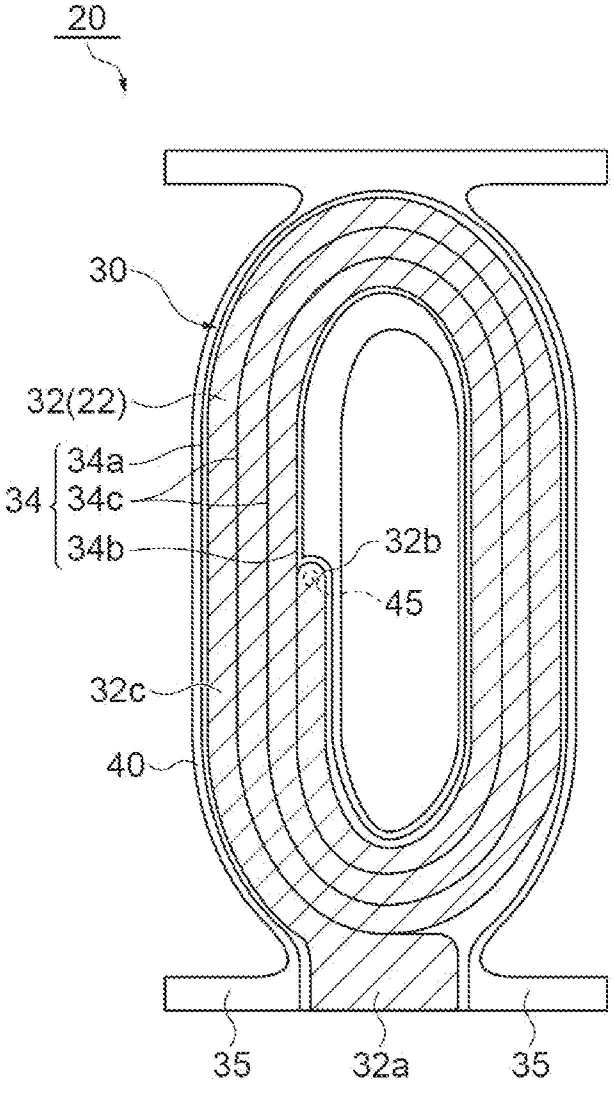
FIG. 4 is a plan view showing the first coil body provided on the upper surface of the substrate.

The first coil body 30 is provided on the upper surface 40*a* of the substrate in the coil forming portion 41. As shown in FIG. 4, the first coil body 30 includes a first planar coil 32 constituting a part of the coil 22 of the coil component 1 and a first insulator 34.

The first planar coil 32 is a substantially oval spiral air-core coil wound around the opening 42 of the coil forming portion 41 in the same layer on the 40*a* of the insulating substrate 40. The number of turns of the first planar coil 32 may be one or a plurality of turns. In the present embodiment, the number of turns of the first planar coil 32 is three to four. The first planar coil 32 has an outer end portion 32*a* (first extraction end portion), an inner end portion 32*b* (first connection end portion), and a first turn portion 32*a* connecting the outer end portion 32*b* and the inner end portion 32*c*. The outer end portion 32*a* is provided so as to be exposed from the end surface 10*c* of the element body 10 and connected to the external terminal 5A. The inner end portion 32*b* is provided in a region covering the through hole 45 of the insulating substrate 40 and has a circular shape when viewed from the thickness direction of the insulating substrate 40. The first planar coil 32 is made of Cu, for example, and can be formed by electrolytic plating.

Figure 2:
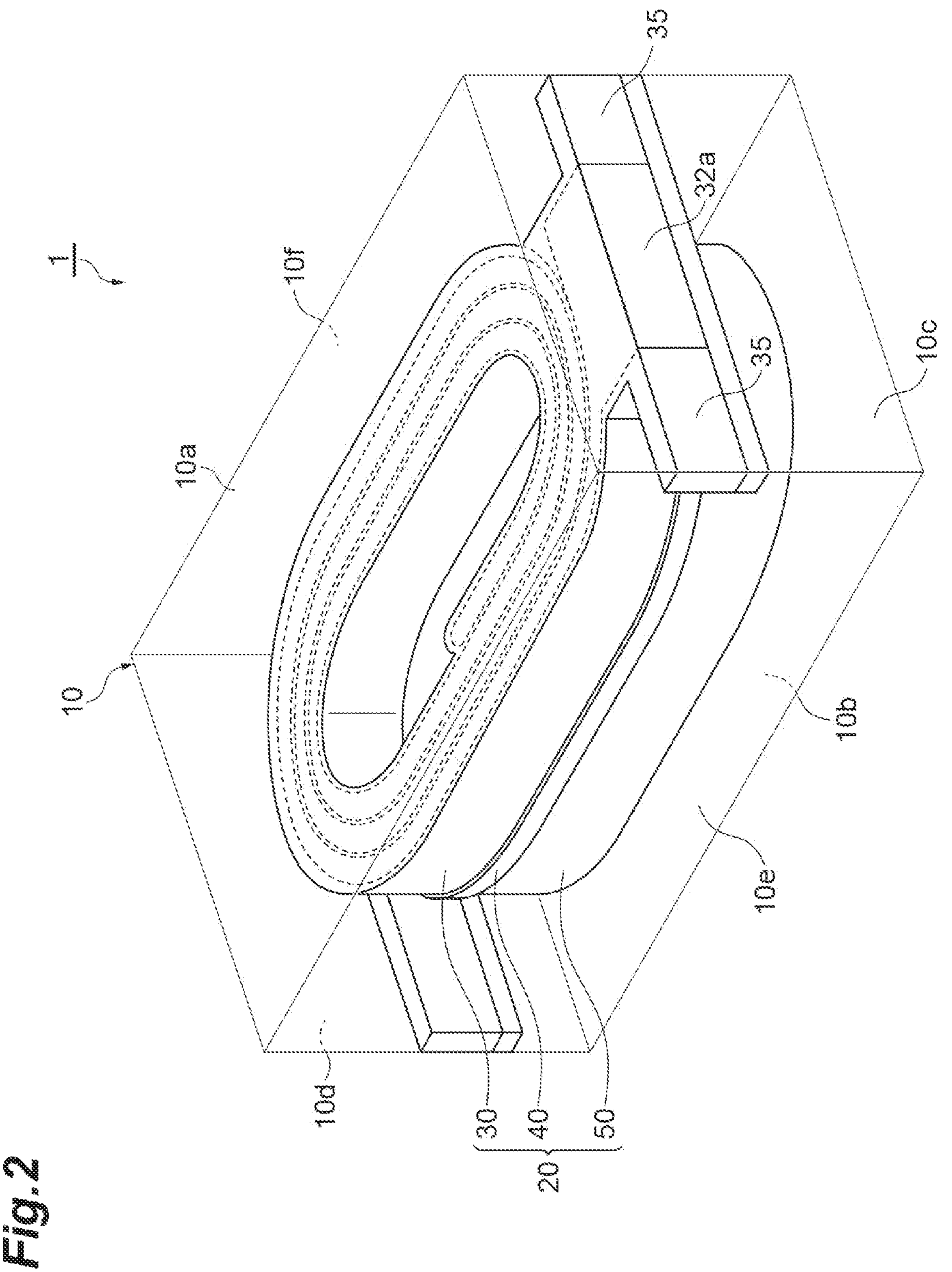
FIG. 2 is a diagram showing an internal structure of an element body of the coil component shown in FIG. 1.

The first insulator 34 is provided on the upper surface 40*a* of the insulating substrate 40 and is a thick-film resist patterned by known photolithography. The first insulator 34 defines a growth region of the first planar coil 32 and covers the first planar coil 32 in the same layer in which the first planar coil 32 is formed. In the present embodiment, the first insulator 34 includes an outer-wall 34*a* and an inner-wall 34*b* that define the contour of the first planar coil 32, and a partition wall 32*c* that separates an inner turn and an outer turn of the first turn portion 34*c* of the first planar coil 32. The first insulator 34 further includes an exposed portion 35. The exposed portion 35 is a wall-shaped portion exposed to the end surface 10*c* of the element body 10 and extends along the end surface 10*c*. As shown in FIGS. 2 and 4, the exposed portion 35 extends across the entire width of the end surface 10*c* so as to sandwich the outer end portion 32*a* of the first planar coil 32. The first insulator 34 is made of, for example, epoxy resin.

The first planar coil 32 is formed by plating growth in a growth region defined by the first insulator 34. The first planar coil 32 includes a seed pattern 40*a* patterned on the upper surface 32*d* of the insulating substrate 40 and a plating portion 32*d* grown on the seed pattern 32*e*.

Figure 6:
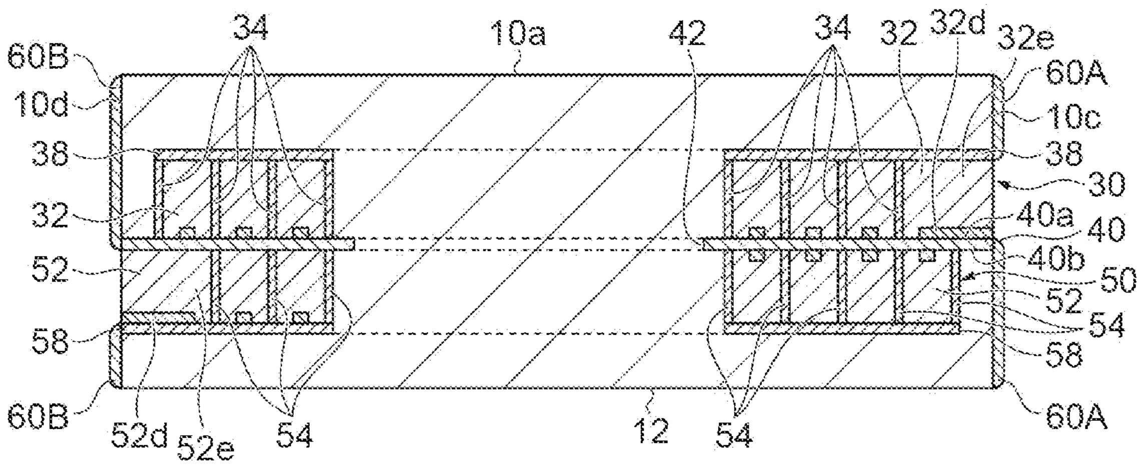
FIG. 6 is a cross-sectional view taken along line VI-VI of the element body shown in FIG. 1.

As shown in FIG. 6, the first coil body 30 further includes a protective film 38 (first insulating layer) that integrally covers the first planar coil 32 and the first insulator 34 from the upper surface 10*a* side of the element body 10. The protective film 38 is made of, for example, epoxy resin. The protective film 38 enhances the insulation between the metal magnetic powder contained in the element body 10 and the first planar coil 32.

Figure 5:
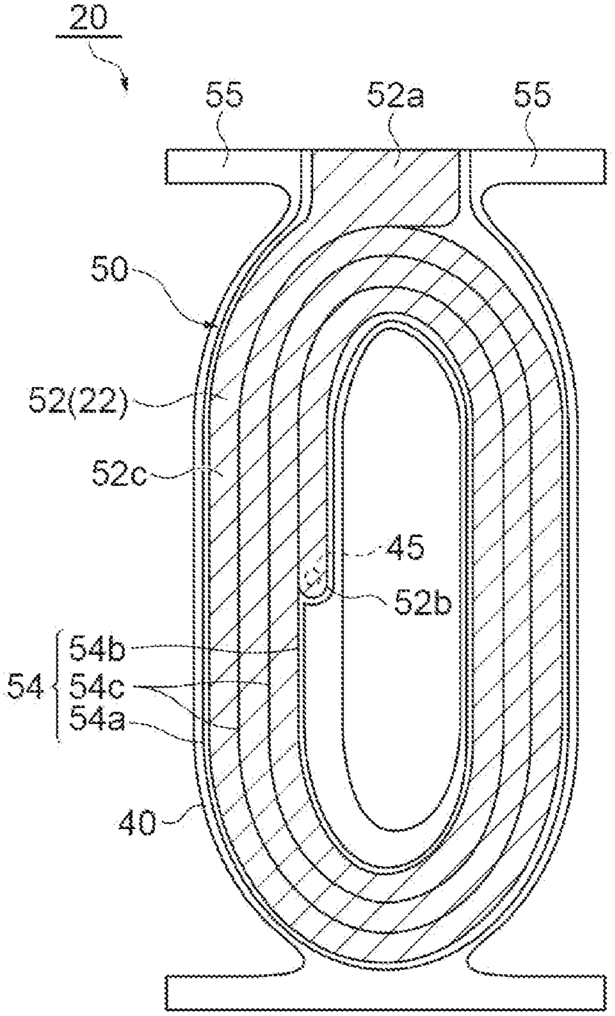
FIG. 5 is a plan view showing the second coil body provided on the lower surface of the substrate.

The second coil body 50 is provided on the lower surface 40*b* of the substrate 40 in the coil forming portion 41. As shown in FIG. 5, the second coil body 50 includes a second planar coil 52 constituting a part of the coil 22 of the coil component 1 and a second insulator 54.

The second planar coil 52 is a substantially oval spiral air-core coil wound around the opening 42 of the coil forming portion 41 in the same layer on the lower surface 40*b* of the insulating substrate 40. The number of turns of the second planar coil 52 may be one or a plurality of turns. In the present embodiment, the number of turns of the second planar coil 52 is three to four. The second planar coil 52 has an outer end portion 52*a* (second extraction end portion), an inner end portion 52*b* (second connection end portion), and a second turn portion 52*a* connecting the outer end portion 52*b* and the inner end portion 52*c*. The outer end portion 52*a* is provided so as to be exposed from the end surface 10*d* of the element body 10 and connected to the external terminal 5B. The inner end portion 52*b* is provided in a region covering the through hole 45 of the insulating substrate 40 and has a circular shape when viewed from the thickness direction of the insulating substrate 40. The second planar coil 52 is made of Cu, for example, and can be formed by electrolytic plating.

The second insulator 54 is provided on the lower surface 40*b* of the insulating substrate 40, and is a thick-film resist patterned by known photolithography. The second insulator 54 defines a growth region of the second planar coil 52 and covers the second planar coil 52 in the same layer in which the second planar coil 52 is formed. In the present embodiment, the second insulator 54 includes an outer-wall 54*a* and an inner-wall 54*b* that define the outline of the second planar coil 52, and a partition wall 52*c* that separates an inner turn and an outer turn of the second turn portion 54*c* of the second planar coil 52. The second insulator 54 further includes an exposed portion 55. The exposed portion 55 is a wall-shaped portion exposed to the end surface 10*d* of the element body 10 and extends along the end surface 10*d*. As shown in FIG. 5, the exposed portion 55 extends over the entire width of the end surface 10*d* so as to sandwich the outer end portion 52*a* of the second planar coil 52. The second insulator 54 is made of, for example, epoxy resin.

Like the first planar coil 32, the second planar coil 52 is formed by plating growth in a growth region defined by the second insulator 54. The second planar coil 52 includes a seed pattern 40*b* patterned on the lower surface 52*d* of the insulating substrate 40 and a plating portion 52*d* grown on the seed pattern 52*e*.

As shown in FIG. 6, the second coil body 50 further includes a protective film 58 (second insulating layer) that integrally covers the second planar coil 52 and the second insulator 54 from the lower surface 10*b* side of the element body 10. The protective film 58 is made of, for example, epoxy resin. The protective film 58 enhances the insulation between the metal magnetic powder contained in the element body 10 and the second planar coil 52.

The first planar coil 32 provided on the upper surface 40*a* of the insulating substrate 40 and the second planar coil 52 provided on the lower surface 40*b* of the insulating substrate 40 are connected to each other at their inner end portions 32*b* and 52*b* via a via conductor in a through-hole 45 penetrating the insulating substrate 40 in the thickness direction. In the present embodiment, the first planar coil 32, the second planar coil 52, and the via conductor constitute an air-core coil 22 around the opening 42 of the insulating substrate 40. The coil 22 has coil axes parallel to a thickness direction of the insulating substrate 40 (i.e., a direction in which the upper surface 10*a* and the lower surface 10*b* face each other).

The first planar coil 32 and the second planar coil 52 are wound such that current flows in the same direction (i.e., the same circumferential direction when the insulating substrate 40 is viewed from the thickness direction) when voltage is applied between both ends of the coil 22 (i.e., the outer end portion 32*a* of the first planar coil 32 and the outer end portion 52*a* of the second planar coil 52). In the present embodiment, as shown in FIG. 4, the circumferential direction of the first planar coil 32 from the outer end portion 32*a* toward the inner end portion 32*b* is clockwise, and as shown in FIG. 5, the circumferential direction of the second planar coil 52 from the inner end portion 52*b* toward the outer end portion 52*a* is clockwise. Since currents flow in the same direction in the first planar coil 32 and the second planar coil 52, generated magnetic fluxes are superimposed on each other to strengthen each other.

The pair of external terminals 5A and 5B are provided on the end surfaces 10*c* and 10*d* of the element body 10, respectively, and cover the entire regions of the end surfaces 10*c* and 10*d*, respectively. In the present embodiment, the external terminals 5A and 5B are formed of resinous electrodes, for example, of resins containing Ag powder. The external terminals 5A and 5B can be formed by metallic plating. The external terminals 5A and 5B may have a single-layer structure or a multi-layer structure.

The pair of external terminals 5A and 5B may be configured such that each of the external terminals 5A and 5B includes a portion covering the upper surface 10*a*, the lower surface 10*b* and the side surfaces 10*e* and 10*f* near the end surfaces 10*c* and 10*d*, and the portion covering the portion continuously extending from the portion covering the end surface 10*c* and 10*d*. In this case, the insulating layer is also formed in regions of the upper surface 10*a*, the lower surface 10*b*, and the side surfaces 10*e* and 10*f* in which the external terminals 5A and 5B are formed so as to be interposed between the external terminals and the element body.

Here, insulating layers 60A and 60B are formed in the remaining regions of the exposed regions of the first insulator 34 and the second insulator 54 in the end surfaces 10*c* and 10*d* of the element body 10. Since the exposed regions of the first insulator 34 and the second insulator 54 extend over the entire width of the end surfaces 10*c* and 10*d*, each of the insulating layers 60A and 60B is divided into two regions that sandwich the exposed region in the vertical direction. The insulating layers 60A and 60B can be formed by, for example, forming on the whole surfaces of the end surfaces 10*c* and 10*d* of the element body 10 and then removing unnecessary portions (exposed regions of the first insulator 34 and the second insulator 54 in the present embodiment) by laser irradiation or the like. As shown in FIG. 6, the insulating layers 60A and 60B cover part or all of the insulating substrate 40 and the protective films 38 and 58 exposed at the end surfaces 10*c* and 10*d*, and are in direct contact with the insulating substrate 40 and the protective films 38 and 58. The insulating layers 60A and 60B may cover a part of at least one of the outer end portion 32*a* of the first planar coil 32 and the outer end portion 52*a* of the second planar coil 52 exposed to the end surface 10*c* and 10*d*. The insulating layers 60A and 60B may be made of resins such as epoxy resins. The thicknesses of the insulating layers 60A and 60B are, for example, 10 nm to 100 μm.

The external terminals 5A and 5B are not in direct contact with the metallic magnetic powder-containing resins constituting the element body 10 in the exposed regions where the first insulator 34 and the second insulator 54 are exposed. In the region other than the exposed region, since the insulating layers 60A and 60B are interposed between the external terminals 5A and 5B and the element body 10, the external terminals 5A and 5B are not in direct contact with the metallic magnetic powder-containing resins constituting the element body 10.

By adopting a configuration in which the external terminals 5A and 5B are not in direct contact with the metallic magnetic powder-containing resins constituting the element body 10 as in the coil component 1 described above, high ESD resistance can be obtained. That is, even when a high transient voltage (for example, 25 kV) is applied between the pair of external terminals 5A and 5B, insulation breakdown is less likely to occur, and improvement in breakdown voltage with respect to the transient voltage can be realized.

In addition, in the first insulator 34 and the second insulator 54, voids (pinholes) are less likely to occur than in the insulating layers 60A and 60B, and insulation breakdown is less likely to occur than in the insulating layers 60A and 60B. The first insulator 34 and the second insulator 54 can be formed by photolithography, and the rate of occurrence of pinholes in the first insulator 34 and the second insulator 54 can be lower than the rate of occurrence of pinholes in the insulating layers 60A and 60B. Therefore, by exposing the first insulator 34 and the second insulator 54 over the entire width of the end surfaces 10*c* and 10*d* of the element body 10 as in the above-described coil component 1, the reliability of the withstand voltage against the transient voltage is improved compared to the case where the insulating layers 60A and 60B are formed over the entire area of the end surfaces 10*c* and 10*d*.

In addition, since the first insulator 34 and the second insulator 54 are exposed over the entire width of the end surfaces 10*c* and 10*d* of the element body 10, it is possible to allow positional deviation when forming the insulating layers 60A and 60B to some extent. That is, when the insulating layers 60A and 60B are patterned (unnecessary portions are removed) by laser irradiation or the like, since the first insulator 34 and the second insulator 54 are exposed over the entire width of the end surfaces 10*c* and 10*d* of the element body 10, direct contact between the external terminals 5A and 5B and the element body 10 can be avoided even if a slight positional deviation occurs.

In this case, the insulating layer (e.g., insulating layer 60B) on the other end surface (e.g., end surface 10*c*) side can be omitted, and the insulator (e.g., second insulator 54) exposed on the other end surface (e.g., end surface 10*d*) does not need to be exposed over the entire width of the end surface. The external terminals 5A and 5B are not in direct contact with the metallic magnetic powder-containing resins constituting the element body 10.

Although the embodiments of the present disclosure have been described above, the present disclosure is not necessarily limited to the above-described embodiments, and various modifications can be made without departing from the scope of the present disclosure. For example, the planar shape of the coil is not limited to an elliptical annular shape or a rectangular annular shape, and may be an annular shape or a polygonal annular shape. The exposed shape of the coil end portion is not limited to a circular shape or a rectangular shape, and may be an elliptical shape or a polygonal shape.

What is claimed is:

1. A coil component comprising:

an element body made of a magnetic material including metal powder and resin, the element body having an upper surface and a lower surface parallel to each other, and a pair of end surfaces orthogonal to the upper surface and the lower surface;

an insulating substrate disposed in the element body, the insulating substrate extending parallel to the upper surface and the lower surface, and is exposed at each of the pair of end surfaces; and a first coil body disposed in the element body and formed on the upper surface of the insulating substrate, the first coil body including a first planar coil having a first connection end portion, a first lead-out end portion, and a first turn portion connecting the first connection end portion and the first lead-out end portion, and a first insulator covering the first planar coil in the same layer as a layer in which the first planar coil is formed;

a second coil body disposed in the element body and formed on the lower surface of the insulating substrate, the second coil body including a second planar coil having a second connection end portion connected to the first connection end portion of the first planar coil via the insulating substrate, a second lead-out end portion, and a second turn portion connecting the second connection end portion and the second lead-out end portion, and a second insulator covering the second planar coil in the same layer as the layer in which the second planar coil is formed; and a pair of external terminals respectively provided on the end surfaces of the element body and respectively connected to the first lead-out end portion of the first planar coil and the second lead-out end portion of the second planar coil, wherein at least one of the first insulator and the second insulator is formed over the entire width of the end surface on the insulating substrate and is exposed, and an insulating layer interposed between the external terminal and the element body is formed in a remaining region of an exposed region in the end surface, and wherein the first coil body and the second coil body are flush with the end face of the element body, and do not protrude from the element body, and the first insulator and the second insulator are thick-film resists having openings at a top or a bottom side thereof.

2. The coil component according to claim 1, wherein both the first insulator and the second insulator are formed over the entire width of the end surface on the insulating substrate and are exposed, and the insulating layer is formed in the remaining region of the pair of end surfaces.

3. The coil component according to claim 1, wherein the insulating layer covers at least a portion of the first insulator or the second insulator exposed at the end surface.

4. The coil component according to claim 1, wherein the first coil body includes a first insulating layer covering the first planar coil from the upper surface side and is exposed at the end surface, and the second coil body includes a second insulating layer covering the second planar coil from the lower surface side and is exposed at the end surface.

* * * * *